Aug. 29, 1972  H. N. ADAMS  3,687,713
PROTECTIVE COATING FOR SURFACES OF SILVER
AND MIRROR FABRICATION
Filed March 15, 1971  2 Sheets-Sheet 1

INVENTOR.
Harvey N. Adams
BY
ATTORNEY.

INVENTOR.
Harvey N. Adams

United States Patent Office 3,687,713
Patented Aug. 29, 1972

---

3,687,713
PROTECTIVE COATING FOR SURFACES OF SILVER AND MIRROR FABRICATION
Harvey N. Adams, Collingswood, N.J., assignor to Denton Vacuum Corporation, Cherry Hill, N.J.
Continuation-in-part of application Ser. No. 727,211, May 7, 1968. This application Mar. 15, 1971, Ser. No. 124,544
Int. Cl. B44d 1/16
U.S. Cl. 117—71 R    13 Claims

ABSTRACT OF THE DISCLOSURE

The present invention includes a protective coating for highly reflective surfaces of silver or silver alloys and is accomplished by applying a transparent layer of aluminum oxide to the surface of silver to be protected and thereafter applying a transparent layer of quartz (silicon dioxide) over the layer of aluminum oxide. In addition the silver is secured on its non-reflecting surface to a layer of chromium-nickel alloy. The entire four layer package can be readily secured to a siliceous substrate, to a plastic substrate or to a highly polished metal substrate and will withstand the normal testing program. Further if there is a layer of aluminum between the chromium-nickel alloy and certain substrates the entire package can be readily peeled off these substrates as is sometimes necessary when producing large mirrors.

CROSS-REFERENCE TO RELATED APPLICATIONS

The present application is a continuation-in-part of my copending application entitled, "Protective Coating for Surfaces of Silver," Ser. No. 727,211, filed May 7, 1968, and now abandoned.

BACKGROUND OF THE INVENTION

In the instrument field it is very desirable to have devices such as mirrors that will provide good reflectivity for light over a wide range of the light spectrum. In addition in the field of decorative pieces of silver such as silver tea services, silver bowls, silver trays, etc. it is very desirable to eliminate the need to continuously "shine" silver—a practice well known to the housewife.

The description of the present invention will be in detail with respect to mirrors, but it should be understood that the invention is equally applicable to decorative silver pieces.

It has been the general practice to fabricate mirrors by applying reflective metals such as silver, platinum, gold, copper, aluminum, chromium, rhodium and the like, by vacuum deposition, onto siliceous substrates such as glass and for some uses onto metal substrates and plastic substrates. Over the years it has been observed that these reflective metals do not adhere satisfactorily to siliceous substrates and that such reflective metal surfaces frequently develop pin holes or blisters and/or peel away in large areas.

Attempts have been made in the prior art to correct this problem of poor adherence by employing an overlay of protective lacquer or shellac. These attempts, for the most part, have not been satisfactory since the shellac or lacquer has not been impervious to moisture, or changes in humidity and temperature, and because overcoatings do not improve the adherence between the mirror coating and the substrate.

When such a mirror has been subjected to repeated changes of humidity and/or temperature, the reflective metal has usually blistered and peeled off. In addition a shellacked or lacquered mirror is limited in its use to a back-view mirror, most of which have been made by chemical reduction processes which are not suitable for front-view mirrors in any case.

In another attempt to correct poor adherence, a thin layer of metallic lead oxide has been bonded to a substrate and the reflective metal applied thereto. However, the metallic lead-oxide mirror will not remain intact and if it is subjected to cycles of humidity and temperature change. In addition, in a back-view mirror the thickness of the metallic lead-oxide necessary to provide a good adherence is sufficiently deep that an undesirable amount of incident light, passing through the metallic lead-oxide layer, is attenuated. Further, the metallic lead-oxide layer does not provide any advantage if it should be used as a front surface mirror. It is known that initially the reflectivity of a vacuum deposited film of silver is greater than 95% through most of the visible spectrum as well as through a good portion of the infrared light spectrum. Despite this high reflectivity, unprotected silver has not been used successfully as a front view mirror because in addition to its poor adherence to siliceous substrates it is soft (and therefore scratches) and tarnishes easily. Thus, unprotected silver films will not stand handling, and cleaning, and the effects of the atmosphere, particularly the sulfides contained in the atmosphere which quickly tarnish the silver.

SUMMARY

As stated above this invention will be primarily described in connection with mirrors or reflecting surfaces, but it should be understood that the protective coating of the present invention can be usefully employed to preserve the "shine" on decorative silver pieces.

With respect to mirrors, the present device is very useful with reflectors which are characterized by very high reflectivity over a very wide range of wave lengths and which are to be employed as front view mirrors. These reflectors are chosen because they display this high reflectivity throughout the visible range and much of the infrared range, at least up to 15 microns wave length. When the protective coating of the present invention is employed with such reflectors they are characterized not only by high reflectivity but by good durability to abrasion, and insensitivity to moisture and other environmental conditions, which normally affect such devices.

The present invention will be better understood by studying the following description in conjunction with the drawings in which:

It should be understood that the figures as shown are greatly exaggerated in size and in proportions of layers relative to one another.

DESCRIPTION OF THE PREFERRED EMBODIMENTS

Figure 1:
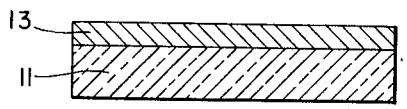
FIG. 1 depicts an iron-chromium-nickel alloy bonded to a glass metal, or plastic substrate.

In FIG. 1 there is depicted a layer of glass 11 upon which there is deposited a layer 13 of chromium-nickel alloy. Chromium-nickel alloy as used herein will be understood to be a metal alloy which includes chromium and nickel but may contain other metals, particularly iron. In a preferred embodiment the alloy is commercially sold as Inconel and is made up of approximately 80% nickel, 14% chromium and 6% iron. It should be understood that various chromium-nickel alloys can be used. The chromium-nickel alloy is applied to the substrate or glass layer 11 by evaporation deposition. The alloy is deposited on the substrate in a thickness of 400 to 500 angstroms. This thickness can be determined by observation, but preferably is determined by use of a modulated beam optical photometer.

The last mentioned piece of equipment provides for angularly projecting a light beam onto the surface onto which the mirror is to be developed. The light reflects off that surface and is directed to a light sensitive element through a filter. When the Inconel builds up to where the reflected light is of a predetermined frequency it will pass through the filter and be detected. Immediately thereafter the energy to heat the evaporant is turned off. Such equipment can be obtained from various manufacturers in the United States and Europe.

While it has been suggested that glass is the substrate 11, it should be understood that other siliceous material, highly polished metallic bases or plastic can be used as a substrate. If the mirror is to be a back surface or back view mirror, then in all likelihood glass or other siliceous material will be the substrate. However, in the fabrication of front view mirrors, which are especially desirable in instruments such as range finders, photo copiers, projectors and the like, the substrate can be other siliceous material, metal substrates such as aluminum, stainless steel, beryllium-nickel and other metals, as well as substrates of plastic.

Figure 2:
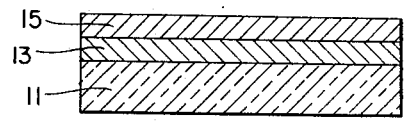
FIG. 2 depicts the device of FIG. 1 with a layer of reflective metal bonded to the chromium-nickel alloy.

In FIG. 2 there is shown a schematic end view of the substrate layer 11 upon which there is bonded the iron-chromium-nickel alloy layer 13 and upon which there has been further deposited a silver metal layer 15. Silver is used in the preferred embodiment because it provides the highest reflectivity over most of the range of the visible spectrum, i.e., from about 4,000 to 7,000 angstroms in wave length, as well as a high reflectivity in the infrared spectrum to at least 15 microns wave length.

In the preferred embodiment the silver is applied to the layer 13 of Inconel, or a layer of nickel-chromium alloy, by evaporation deposition. All layers are normally applied successively in the same vacuum. The substrate 11 with the layer of Inconel secured thereto is placed in an evaporation chamber and subjected to an evaporant vapor of silver. The silver evaporant boat is heated to approximately 1200° C. to effect the evaporation thereof. Again the proper thickness of the silver (which is between 700 to 1,000 angstroms) can be determined by observation, but preferably a modulated beam photometer is employed. While I have indicated that evaporation deposition is employed in the preferred embodiment, it should be understood that sputtering can be used to deposit the layer of silver on the Inconel or aluminum-nickel alloy. By employing a sputtering technique, dielectric materials, as well as other materials, can be deposited in substantially undecomposed form. The use of radio frequency fields enables such materials as metal oxides, non-electrical conducting materials and dielectric materials to be deposited with a minimum of deterioration thereof. The sputtering process as such is carried out at considerably higher pressures than the vacuum evaporation process. Most vacuum evaporation work is carried out at pressures of $10^{-4}$ torr (mm. mercury) or lower. Sputtering is accompanied through a plasma in the vacuum chamber which means a lesser degree of vacuum or a higher pressure. Sputtering work may be carried out at pressures from perhaps .2 torr down to approximately $10^{-3}$ torr under suitable conditions.

I have found that silver which has been deposited on an iron-chromium-nickel alloy, such as Inconel, has a very strong adherence thereto. Such silver layers cannot be removed by the generally employed adherence tests such as applying adhesive tape to the silver and pulling the tape off. The adherence of the silver to the Inconel enables the mirror to be handled or to be wiped with a soft cloth. At the same time the Inconel has been found to have a good affinity for glass so that the three layers discussed thus far, namely the glass, Inconel and silver provide a relatively secure package when fabricated as taught herein. However, the mirror depicted in FIG. 2 will succumb to common atmospheric conditions such as high humidity and relatively high temperatures, as well as air borne traces of corrosive (to silver) chemical compounds. In order to provide a mirror which can withstand a "mil-spec" humidity test, i.e., being placed in a chamber of 95% to 100% relative humidity at 120° F. for 24 hours, I have found that two more layers of material must be added to the package.

Figure 3:
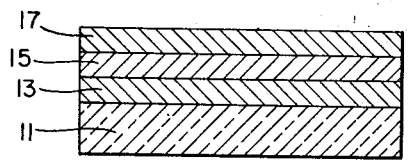
FIG. 3 depicts the device of FIG. 2 with a layer of aluminum oxide bonded to the reflective metal layer.

Onto the silver layer 15 there is deposited an aluminum oxide layer 17 as shown in FIG. 3. The aluminum oxide layer 17 is deposited by an electron gun technique. Such an electron gun can be obtained from Denton Vacuum of Cherry Hill, N.J. The electron gun employs the principle of subjecting the evaporant to a stream of electrons. The evaporant can be held by a boat, or held as a crystal or by some holder means. Accordingly, the evaporant of aluminum oxide is subjected to a beam of electrons and thus selectively heated at 2100° C. and the area thus heated evaporates and deposits onto the layer of silver.

The layer of aluminum oxide 17 is deposited to a thickness of about 1,000 to 1,100 angstroms. The thickness of the aluminum oxide is significant. In the preferred embodiment we are considering a front view mirror and hence the light will be reflected from the silver through the aluminum oxide toward the viewer. By depositing the aluminum oxide to a thickness of between 1,000 to 1,100 angstroms, I create a transparent layer which is approximately one-quarter of the wave length of light at the lower end of the visible spectrum of light. This is to say if we consider that 4,000 angstroms is at the lower end of the visible range than 1,000 angstroms is one-quarter of a wave length at that point. The rationale will become more apparent with the description of FIG. 5.

Figure 4:
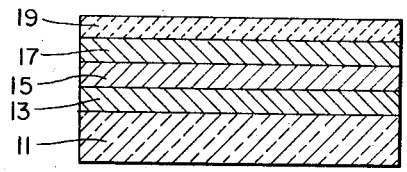
FIG. 4 depicts the device of FIG. 3 with a layer of quartz bonded to the aluminum oxide layer.

In addition I have found that 1,000 angstroms of aluminum oxide is sufficiently thick to provide good adherence to the silver layer 15 and provide a good base upon which the quartz layer 19 is deposited (FIG. 4). The 1,000 angstroms layer of aluminum oxide is sufficiently thick and of such particular wave length characteristics that there is an enhancement of reflected light., i.e., the reflection is improved.

Finally to the aluminum oxide layer 17 there is applied a quartz layer 19, i.e., a layer of silicon dioxide as depicted in FIG. 4. The quartz layer 19 is deposited on the aluminum oxide layer by means of an electron gun technique as discussed above. The quartz evaporant is selectively raised to a temperature of 1900° C. and is deposited on the aluminum oxide layer to a thickness of 1,000 to 1,100 angstroms. The layer of quartz at 1,000 to 1,100 angstroms thick provides enhancement of the reflected light.

Further, the quartz layer provides an excellent sealant and is securely bonded to the silver by virtue of the particular affinity that aluminum oxide has for both the quartz and the silver. The mirror package composed of the substrate layer, the chromium-nickel alloy layer, the silver metal layer, the aluminum oxide layer and the silicon dioxide layer provides a mirror which can withstand a humidity cycle of 95% to 100% relative humidity, at 120° F. for 24 hours without any damage.

Figure 5:
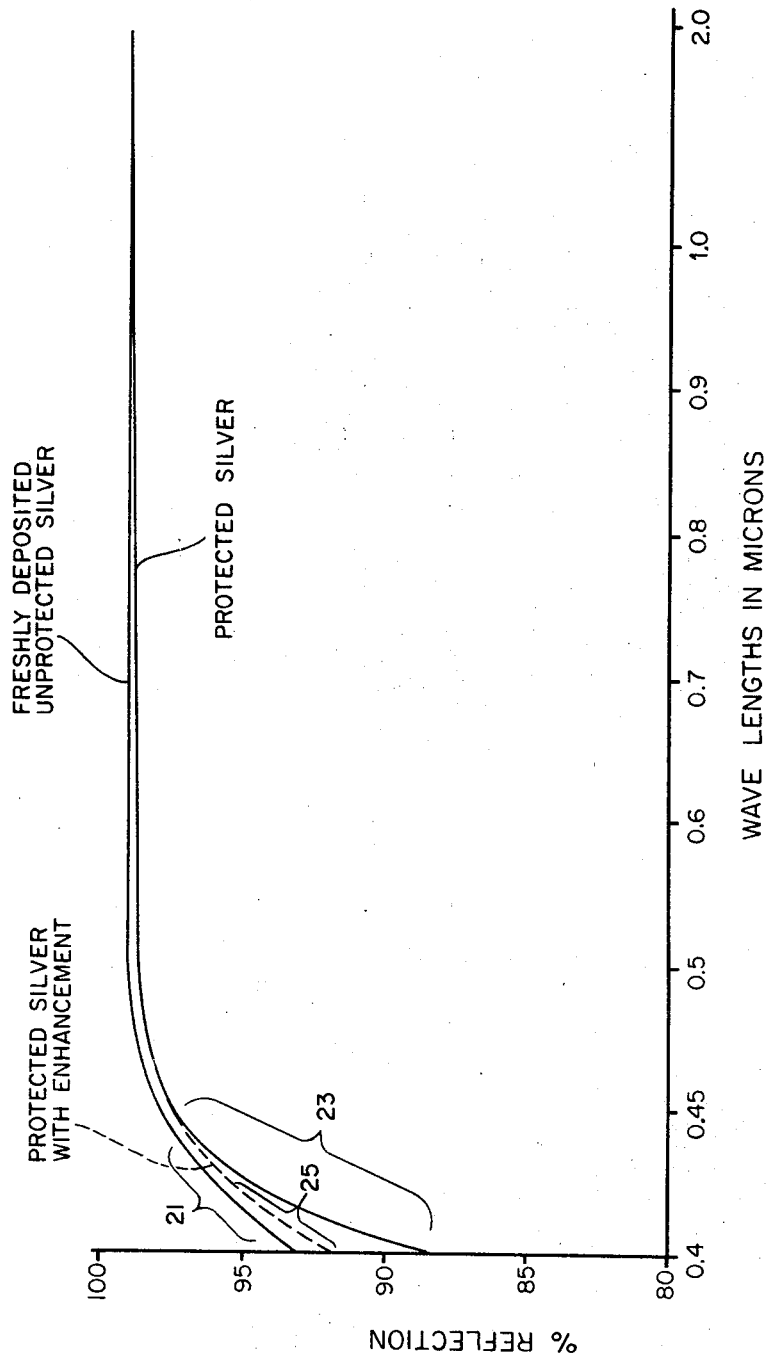
FIG. 5 is a graph showing the reflection characteristics of the present mirror and the reflection characteristics of an unprotected mirror.

FIG. 7 depicts the relationship between reflectivity and wave length of light energy. In FIG. 5 it is apparent that an unprotected film layer of silver will provide 98% or better reflectivity from about 4,500 angstroms through the visible range of 7,000 angstroms and actually into the infrared spectrum. Between 4,500 angstroms and 4,000 angstroms (the lower end of the visible light range), the reflectivity falls off from 98% to about 93%. This is evident at graph section 21 in FIG. 5.

It will be noted that the protected layer of silver, in accordance with this invention, provides a reflectivity curve which is about 97% or about for most of the visible spectrum, and falling off to 88% at 4,000 angstroms. When a film layer of silver is protected with a layer of aluminum oxide and a layer of silicon dioxide (quartz) the reflectivity falls off in a more pronounced manner from 97% to 88%, as evidenced by graph section 23. If the layer of aluminum oxide is built or deposited to a thickness of 1,000 to 1,100 angstroms and the layer of quartz is deposited to a thickness of 1,000 angstroms to 1,100 angstroms (which is one quarter of the length of the "fall off" range of 4,000 to 4,500 angstroms) the reflectivity is enhanced to about 92%. This is evident from graph section 25.

Accordingly, if the protective layer is deposited with the proper thickness, as taught herein, it is not only a good sealant but it enables the protected silver to approximate the reflectivity of unprotected silver.

I have produced mirrors in accordance with the above teaching, the following of which is an example:

Example

A glass substrate was placed in a high vacuum chamber which was operating at $5 \times 10^{-5}$ mm. Hg. A quantity of Inconel was loaded onto a tungsten boat which was disposed 20 inches from the substrate. The Inconel was heated to its evaporation temperature of approximately 1900° C. and a film of approximately 400 angstroms of Inconel was deposited onto the glass. Thereafter a quantity of silver was loaded into a tungsten boat and the Inconel surface on the glass substrate was disposed 20 inches therefrom. The silver was heated to approximately 1200° C. (its temperature of evaporation) and an opaque silver film of about 700 to 1,000 angstroms was deposited onto the Inconel. Thereafter a solid piece of aluminum oxide previously placed into a water cooled copper crucible located about 20 inches from the layer of silver was subjected to a focussed high intensity beam of electrons from an electron gun to effect evaporation thereof. The layer of alumina (aluminum oxide) was deposited on the silver layer to provide a layer of ¼ of a wave length at 4,000 angstroms. The thickness was controlled and measured by a Model 17 BP2B Edwards High Vacuum Ltd. photometer. Thereafter quartz $(SiO_2)$ previously loaded into another water cooled copper crucible, disposed 20 inches from the layer of alumina was subjected to the electron beam from the electron gun. Once again the evaporant (quartz) was deposited on the last layer (alumina in this case) to a thickness of 400 millimicrons, which is one quarter wave length at the low end of the visible spectrum. With this mirror I was able to detect a reflectivity that closely approached the reflectivity of a freshly deposited (untarnished) and unprotected silver mirror. The curves were determined on a Beckman DK-2A spectrophotometer which had been calibrated against various standards.

It is to be understood that in the operation of this process there are many variations which may be employed within the scope of the process. It has already been noted that there are numerous alloys from the iron, chromium, nickel group which may be employed successfully as the base to which the silver is applied. Among these are Inconel (noted above) and nichrome (20% chromium, 80% nickel), pure chromium, etc. In some instances, it is desirable to start evaporating the silver before the under layer coating is complete. This alloy produces even greater adherence.

It is possible to add more dielectric layers of various materials to the mirror once the basic adherent silver has been coated with the alumina and the quartz. It is possible by adding alternate layers of high and low refractive index materials with optical thickness approximating one quarter wave length of light in the region from 4,000 to 4,500 angstroms, to continue the enhancement of the reflectivity of the silver in this region. Such a practice may reduce the reflectivity slightly at longer wave lengths through the visible spectrum, but this is a relatively minor effect.

Figure 6:
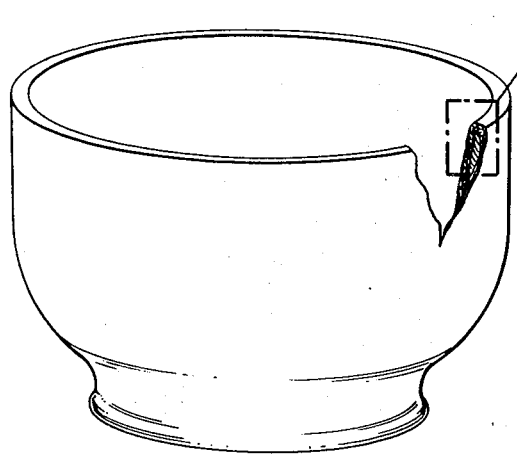
FIG. 6 depicts a silver bowl sectionalized at one portion to show the protective coating.
Figure 6A:
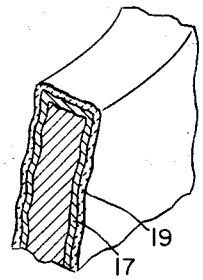

FIG. 6 depicts a silver bowl to which there has been applied the protective coating of aluminum oxide and quartz. The silver bowl will be subjected to the same procedure as that described above with respect to the mirrors. With the protective coating thereon the silver bowl will nonetheless have a "high shine" resembling that of a silver bowl which has been freshly cleaned with a "silver polish." The bowl can be cleaned with a soft cloth and handled without readily breaking this protective coating. FIG. 6A is a view of a broken section of the bowl wherein there is shown the silver structure 21, the aluminum oxide layer 17 and the quartz layer 19. While a silver bowl is depicted, it should be understood that the protective coating of this invention can be readily and usefully employed with other forms of decorative silver items such as silver tea services, trays, creamers, etc.

In the course of fabricating the above-described mirror two additional innovations have come into being and constitute the need for this continuation-in-part application. In fabricating mirrors it is the practice to deposit the reflecting surface on an extremely smooth surface and the smooth surface is normally provided by the presence of a highly polished substrate. If the substrate is a siliceous material, such as glass, and if for some reason in the deposition of the layers of Inconel, silver, aluminum oxide and quartz (or their substitutes as taught heretofore) the material ripples or inadvertently a fingerprint is placed on the glass substrate before deposition or for any number of reasons the mirror package is marred and therefore unacceptable, it is virtually impossible to peel off or remove the Inconel from the substrate surface.

Accordingly as in the case of large glass mirrors the glass substrate would have to be discarded and such a practice represents a costly error and unacceptable waste of time and money. I have found that if I deposit a flash of aluminum between the layer of Inconel and the glass substrate, I can remove the mirror package if necessary by placing the imperfect mirror in a bath of hydrochloric acid. The hydrochloric acid separates the aluminum from the glass and the whole mirror package can be stripped from the substrate. Nonetheless, even though the mirror package (i.e., layer of Inconel, silver, aluminum oxide and quartz) can be stripped from a siliceous substrate, nonetheless, when the mirror package is secured to a siliceous substrate by a flash of aluminum, the new package (i.e., the siliceous substrate, the aluminum layer, the Inconel layer, the silver layer, the aluminum oxide layer and the quartz layer) will withstand all of the humidity and temperature tests heretofore described. In other words, the new mirror package has all the fine attributes of the mirror package without the flash of aluminum and has the added advantage that it can be stripped if necessary.

It should be understood that a flash of aluminum is a layer of aluminum approximately 200 angstroms thick which is deposited by a "weigh change" or deposited with a vacuum deposition technique.

The second innovation goes to finding that the original mirror package of Inconel, silver, aluminum oxide and quartz can be readily built onto a plastic substrate. A highly polished plastic substrate serves as a suitable smooth surface and if the original mirror package is built up on such a smooth surface the mirror will reliably adhere to the plastic while being subjected to the humidity and temperature tests set forth hereinbefore.

What is claimed is:

1. protective coating means on a substrate, comprising in combination, a substrate having an outer surface of substantially silver, a layer of aluminum oxide secured to said outer surface, and a layer of silicon dioxide secured to said layer of aluminum oxide.

2. Protective coating means on a substrate according to claim 1 wherein said outer surface is substantially pure silver.

3. Protective coating means on a substrate according to claim 1 wherein said outer surface is a silver metal alloy selected from the group: nickel-chromium-iron-silver chromium-nickel-silver, and chromium-silver.

4. Protective coating means on a substrate according to claim 1 wherein said substrate comprises a layer of metal material, a layer of chromium-nickel alloy secured to said layer of metal material, and a layer of material of substantially silver secured to said layer of chromium-nickel alloy.

5. Protective coating means on a substrate according to claim 1 wherein said substrate comprises a layer of a highly polished metal, a layer of chromium-nickel alloy secured to said layer of highly polished metal, and a layer of material of substantially silver secured to said layer of chromium-nickel alloy.

6. Protective coating means on a substrate according to claim 1 wherein said substrate comprises a layer of plastic material, a layer of chromium-nickel alloy secured to said layer of plastic, and a layer of material of substantially silver secured to said layer of chromium-nickel alloy.

7. Protective coating means on a substrate according to claim 1 wherein said substrate consists of a decorative silver item.

8. Protective coating means on a substrate according to claim 1 wherein said substrate comprises a layer of siliceous material, a layer of chromium-nickel alloy secured to said layer of siliceous material, and a layer of material of substantially silver secured to said layer of chromium-nickel alloy.

9. Protective coating means on a substrate according to claim 8 wherein said layer of material containing silver is a layer of substantially pure silver.

10. Protective coating means on a substrate according to claim 1 wherein said layer of aluminum oxide has a thickness which is equal to ¼ of a particular wavelength, said wavelength being a wavelength of energy in the light spectrum whereat the reflection of light is to be enhanced and wherein said layer of silicon dioxide has substantially the same thickness as said layer of aluminum oxide.

11. Protective coating means on a substrate according to claim 10 wherein said particular wavelength is between 4000 and 7000 angstroms.

12. Protective coating means on a substrate according to claim 1 wherein said substrate comprises a layer of siliceous material, a layer of aluminum secured to said layer of siliceous material, a layer of chromium-nickel alloy secured to said layer of aluminum, and a layer of material of substantially silver secured to said layer of chromium-nickel alloy.

13. Protective coating means on a substrate according to claim 12 wherein said layer of aluminum is approximately 200 angstroms in thickness.

References Cited

UNITED STATES PATENTS 3,601,471   8/1971   Seddon _____ 117—35 V

ALFRED L. LEAVITT, Primary Examiner

C. K. WEIFFENBACH, Assistant Examiner

U.S. Cl. X.R.

117—35 R, 35 V, 70 A, 70 C, 71 M